United States Patent [19]
Kiesel

[11] Patent Number: 5,509,513
[45] Date of Patent: Apr. 23, 1996

[54] BIDIRECTIONAL SNUBBER FOR A HYDRAULIC SUSPENSION CYLINDER

[75] Inventor: Mark J. Kiesel, Dunlap, Ill.

[73] Assignee: Caterpillar Inc., Peoria, Ill.

[21] Appl. No.: 323,642

[22] Filed: Oct. 17, 1994

[51] Int. Cl.[6] ........................................... F16F 9/48
[52] U.S. Cl. ............................ 188/289; 188/322.17
[58] Field of Search ......................... 188/284, 322.11, 188/322.16, 322.17, 322.22, 289

[56] References Cited

U.S. PATENT DOCUMENTS

| | | | |
|---|---|---|---|
| 1,655,786 | 1/1928 | Guerritore | 188/289 |
| 2,332,520 | 10/1943 | Lucht | 188/289 X |
| 2,453,966 | 11/1948 | Brown et al. | 188/289 |
| 4,039,177 | 8/1977 | Person et al. | 188/289 X |

*Primary Examiner*—Josie Ballato
*Attorney, Agent, or Firm*—John W. Grant

[57] ABSTRACT

An end-of-stroke bidirectional snubber for a suspension cylinder includes an elongate snubber element having a first flow regulating end portion co-acting with an annular edge for gradually restricting fluid flow from a head end chamber as the piston approaches an end wall of a casing to snub end-of-stroke retraction motion of a piston rod. The snubber element also has a second flow regulating end portion which coacts with a radial passage for gradually restricting fluid flow from a rod end chamber as the piston approaches an end of cap to snub end-of-stroke extension motion of the piston rod.

9 Claims, 1 Drawing Sheet

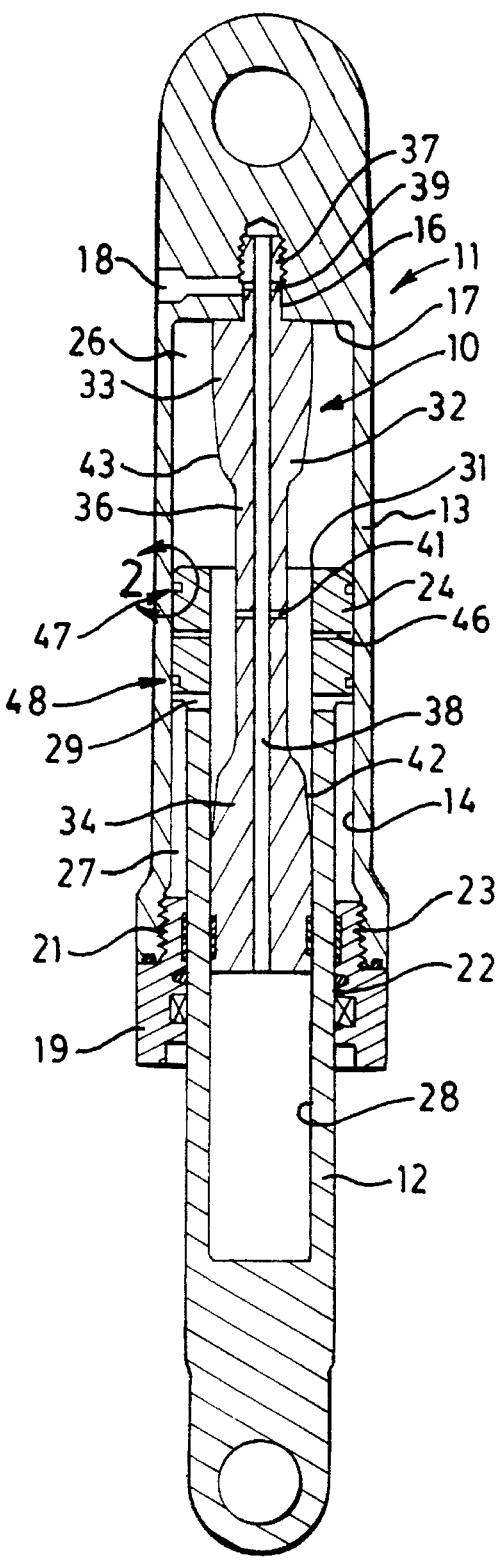

5,509,513

BIDIRECTIONAL SNUBBER FOR A HYDRAULIC SUSPENSION CYLINDER

TECHNICAL FIELD

This invention relates to a hydraulic suspension cylinder and more particularly to a bidirectional end-of-stroke snubber incorporated therein.

BACKGROUND ART

Many double-acting hydraulic suspension cylinders have separate snubbers for hydraulically cushioning or snubbing end-of-stroke motion in both rod extension and rod retraction directions. Such suspension cylinders typically have radially extending free-flow ports communicating the head end and rod end chambers during extension and retraction of the cylinder. Snubbing of the end-of-stroke movement during extension is accomplished by blocking fluid flow through the free-flow ports with the rod wear ring seated in a groove in the end cap. One of the problems encountered therewith is that blocking the free-flow passages occurs suddenly with little or no modulation. This results in a fairly harsh snubbing action and generates high pressure spikes that damage the seals and other components of the cylinder. Moreover, the high pressure oil flow through the free-flow ports impinging on the rod wear ring causes significantly increased wear thereof. Finally, assembly of the suspension cylinder is made more difficult since each separate snubber requires a number of distinct components.

Accordingly, it would be desirable to provide a suspension cylinder with a bidirectional snubber which does not use the wear rings for the snubbing action, gradually restricts oil flow between actuating chambers for reducing high pressure spikes and for increasing the duration of the snubbing action, and reduces the number of components for easy assembly.

SUMMARY OF THE INVENTION

In one aspect of the present invention, a bidirectional end-of-stroke snubber is incorporated within a suspension cylinder which includes a tubular casing having an access port and open and closed ends, a cap sealingly fitted within the open end of the casing and having a bore extending therethrough, a piston rod slidably extending through the bore, and a piston attached to the piston rod and being slidably disposed within the casing to define head end and rod end chambers on opposite sides thereof. An axially extending bore in the piston rod opens into the rod end chamber and has a closed end. A radial passage in the piston rod communicates the piston rod bore with the rod end chamber. An elongate snubber element is co-axially disposed within the casing and has first and second flow regulating end portions separated by a reduced diameter stem, a passage extending axially therethrough and being in continuous communication with the access port, and a radial port in the stem in communication with the passage. The first flow regulating portion is connected to the closed end of the casing and disposed to gradually block communication between the piston rod bore and the head end chamber as the piston approaches its retracted end-of-stroke position. The second flow regulating portion is disposed to gradually block communication through the radial passage in the piston rod as the piston rod approaches its extended end-of-stroke motion. A means is provided for connecting the snubber to the closed end of the casing.

BRIEF DESCRIPTION OF THE DRAWINGS

FIG. 1 is a cross sectional view through a suspension cylinder embodying the principles of the present invention; and FIG. 2 is an enlarged sectional view of a portion of FIG. 1 encircled by the line 2.

BEST MODE FOR CARRYING OUT THE INVENTION

A bidirectional end-of-stroke snubber 10 is disposed within a suspension cylinder 11 having a piston rod 12 telescopically extending into a tubular casing 13 which defines an open-ended bore 14. The casing has a counterbore 16 axially extending from a closed end 17 of the bore 14 and an access port 18 communicating with the counterbore. A closure cap 19 is sealingly fitted within an open end 21 of the bore 14 and has a bore 22 extending axially therethrough. The cap 19 is suitably removably secured to the casing, for example, by a threaded connection 23.

The piston rod 12 slidably extends through the bore 22 in the cap 19 and has a piston 24 attached to the inner end to define head end and rod end chambers 26,27 respectively on opposite sides thereof. In this embodiment, the piston is formed as an integral part of the piston rod. The piston rod has an axially extending bore 28 opening into the head end chamber 26 and a plurality of radial passages 29 extending through the wall for communicating the rod end chamber 27 with the bore 28. A metering edge 31 is formed at the open end of the bore 28.

The snubber 10 includes an elongate snubber element 32 disposed within the casing 13 and has first and second flow regulating end portions 33,34 separated by a reduced diameter stem 36. The flow regulating end portion 33 has an axially extending tang 37 extending into and suitably mechanically connected to the counterbore 16 such as by a threaded joint. The snubber element has an axially extending passage 38, a plurality of radial passages 39 continuously communicating the axial passage 38 with the access port 18, and a plurality of radial passages 41.

The flow regulating portion 34 is telescopically disposed within the bore 28 and has a contoured annular metering surface 42 formed thereon. The flow regulating end portion 33 similarly has an annular contoured metering surface 43 formed thereon. In this embodiment, the metering surfaces 42,43 are frustoconical shaped.

A plurality of bypass ports 46 extend radially through the piston 24 and communicate the bore 28 with an outer peripheral surface of the piston. A check valve 47 provides limited fluid flow between the bypass ports and the head end chamber 26 and blocks reverse fluid flow therethrough. Similarly, a check valve 48 provides limited fluid flow from the bypass ports 46 to the rod end chamber 27 while blocking reverse fluid flow therethrough. Each of the check valves includes an annular groove 49 having opposite end faces 51,52 and a ring 53 disposed within the annular groove and being in sliding contact with the bore 14. The ring has an axially extending annular protrusion 54 disposed for sealing engagement with the end face 52 and a plurality of circumferentially spaced notches, one of which is shown at 56, formed therein. The rings 53 also function as piston wear rings and can be made from plastic or any suitably nonscoring metal. The ring 53 is sized to provide limited axial movement between the end faces 51,52 and to provide limited flow through the groove 49 as hereinafter described.

Industrial Applicability

In use, the suspension cylinder 11 is filled with a fluid such as hydraulic oil and the port 18 is connected to an accumulator. When the piston rod 12 is retracted due to external forces applied to the suspension cylinder 11, some of the fluid from the head end chamber 26 passes through the ports 29 to fill the expanding rod end chamber 27 while a greater portion of the fluid passes through the ports 41, the passage 38, the ports 39, and the access port 18 to the accumulator. As the end portion 33 of the snubber enters the bore 28 of the piston during the retraction stroke, a portion of the fluid in the head end chamber is partially trapped and is forced to pass through a restricted flow path created by the coaction of the metering edge 31 and the metering surface 43. The size of the annular flow path gradually decreases during the retraction stroke to increase the snubbing action and substantially stops the retraction motion before the piston mechanically engages the end surface 17.

During the portion of the retraction stroke described above, the protrusion 54 of the ring 53 of the check valve 47 is urged into sealing engagement with the end face 52 blocking fluid flow from the head end chamber 26 to the passage 46. However, once the piston rod starts to extend from its retracted position, the ring 53 moves away from the face 52 allowing fluid flow through the notches 56 to fill the expanding head end chamber.

The snubbing of the end-of-stroke motion during extension is achieved by coaction of the radial passages 29 and the metering surface 42 of the end portion 33. More specifically, as the piston rod 12 moves downwardly relative to the snubber element, the metering surface 42 starts to block fluid flow through the radial passages 29 thereby preventing fluid from being freely expelled from the rod end chamber 27. The degree of restriction is proportional to the extending motion of the piston rod 12 and gradually increases to increase the snubbing action such that extending movement of the piston rod is substantially stopped prior to the piston 31 engaging the end cap 19. The check valve 48 acts similarly to the check valve 47 to permit fluid flow into the expanding rod end chamber 27 during retraction of the piston rod from the extended end-of-stroke position.

In view of the foregoing, it is readily apparent that the structure of the present invention provides an improved bidirectional end-of-stroke snubber for a suspension cylinder wherein the snubbing action during both retraction and extension is provided by a single snubber element. The snubber element has a pair of contoured metering surfaces which gradually increase the snubbing action at both the retraction and extension end-of-stroke movement to smoothly snub the motion of the piston rod. The use of the single snubber element reduces the number of components thereby simplifying assembly of the suspension cylinder.

Other aspect, objects, and advantages of this invention can be obtained from a study of the drawings, the disclosure, and the appended claims.

I claim:

1. A bidirectional end-of-stroke snubber for a suspension cylinder having a tubular casing having an access port and open and closed ends, a closure cap sealingly fitted in the open end of the casing and having a bore extending therethrough, a piston rod slidably extending through the bore in the cap, a piston attached to the piston rod and being slidably disposed within the casing to define head end and rod end chambers on opposite sides thereof comprising:

an axially extending bore in the piston rod opening into the head end chamber;

a radial passage in the piston rod communicating the bore in the piston rod with the rod end chamber;

an elongate snubber element coaxially disposed within the casing and having first and second flow regulating end portions separated by a reduced diameter stem, a passage extending axially therethrough and being in continuous communication with the access port, and a radial port in the stem communicating with the passage, the first end portion being secured to the closed end of the casing and disposed to gradually block fluid flow between the head end chamber and the bore of the piston rod as the piston approaches its retracted end-of-stroke position, the second end portion being disposed to gradually block fluid flow through the radial passage in the piston rod as the piston approaches its extended end-of-stroke position; and means to connect the snubber element to the closed end of the casing.

2. The bidirectional snubber of claim 1, wherein the second end portion has a contoured metering surface disposed to coact with the radial passage in the piston rod to gradually reduce fluid flow between the rod end chamber and the bore in the piston rod as the piston approaches its extended end-of-stroke position.

3. The bidirectional snubber of claim 1, wherein the bore in the piston rod defines an annular metering edge and the first end portion has a contoured metering surface disposed to coact with the annular metering edge to gradually reduce fluid flow between the head end chamber and the bore in the piston rod as the piston approaches the retracted end-of-stroke position.

4. The bidirectional snubber of claim 3, wherein the second end portion has a contoured metering surface disposed to coact with the radial passage in the piston rod to gradually reduce fluid flow between the rod end chamber and the bore in the piston rod as the piston approaches the extended end-of-stroke position.

5. The bidirectional snubber of claim 4, wherein the connecting means includes a counterbore recessed into the closed end of the casing and a tang on the snubber element extending into and mechanically secured to the bore.

6. The bidirectional snubber of claim 5, wherein the connecting means includes a threaded joint disposed to mechanically secure the tang to the bore.

7. The bidirectional snubber of claim 1, including a check valve disposed to block fluid flow from the head end chamber to the bore of the piston rod as the piston moves toward the closed end of the casing and provides limited fluid flow from the bore of the piston to the head end chamber as the piston moves away from the closed end of the casing.

8. The bidirectional snubber of claim 7, including another check valve disposed to block fluid flow from the rod end chamber to the bore of the piston as the piston approaches the end cap and provides limited fluid flow from the bore of the piston to the rod end chamber as the piston moves away from the cap.

9. The bidirectional snubber of claim 8, wherein each of the check valves includes a bypass passage in the piston communicating the outer surface of the piston with the bore of the piston rod, an annular groove in the outer surface of the piston and having opposed side walls, and a ring positioned in the groove for limited axial motion between the side walls, the ring having a sealing surface mateable with one of the side walls at one axial position of the ring and a plurality of circumferentially spaced bypass notches to permit fluid flow through the groove at another position of the ring.

* * * * *